United States Patent [19]
Beck

[11] Patent Number: 4,651,624
[45] Date of Patent: Mar. 24, 1987

[54] HYDRAULIC CONTROL ARRANGEMENT

[75] Inventor: Walter Beck, Schwieberdingen, Fed. Rep. of Germany

[73] Assignee: Robert Bosch GmbH, Stuttgart, Fed. Rep. of Germany

[21] Appl. No.: 756,961

[22] Filed: Jul. 18, 1985

[30] Foreign Application Priority Data

Aug. 24, 1984 [DE] Fed. Rep. of Germany ....... 3431104

[51] Int. Cl.$^4$ .............................................. F15B 11/08
[52] U.S. Cl. ....................................... 91/445; 91/420; 91/448; 91/459; 91/516
[58] Field of Search ................. 91/516, 444, 445, 446, 91/447, 448, 459, 420

[56] References Cited

U.S. PATENT DOCUMENTS

| | | | |
|---|---|---|---|
| 2,778,378 | 1/1957 | Presnell | 91/516 X |
| 3,465,519 | 9/1969 | McAlvay et al. | 91/516 X |
| 4,344,355 | 8/1982 | Schwerin | 91/445 |
| 4,475,442 | 10/1984 | Breeden | 91/461 |

Primary Examiner—Edward K. Look
Attorney, Agent, or Firm—Michael J. Striker

[57] ABSTRACT

A hydraulic control arrangement for height regulation of an agricultural vehicle has a control valve with a control slider provided with a first piston portion with a control edge and a second piston portion with a throttle point. In the positions of neutral and lifting of the control slider the control edge blocks the communication from a control chamber to a working chamber which is connected with a spring chamber of a throttle valve. In the position of lifting the control edge opens and the pressure medium flows via the throttle point from the working chamber in the control chamber. Thereby the pressure in the spring chamber of the throttle valve is lifted. Therefore a lower neutral circulating pressure and a higher pressure level in the position of lifting is possible.

9 Claims, 1 Drawing Figure

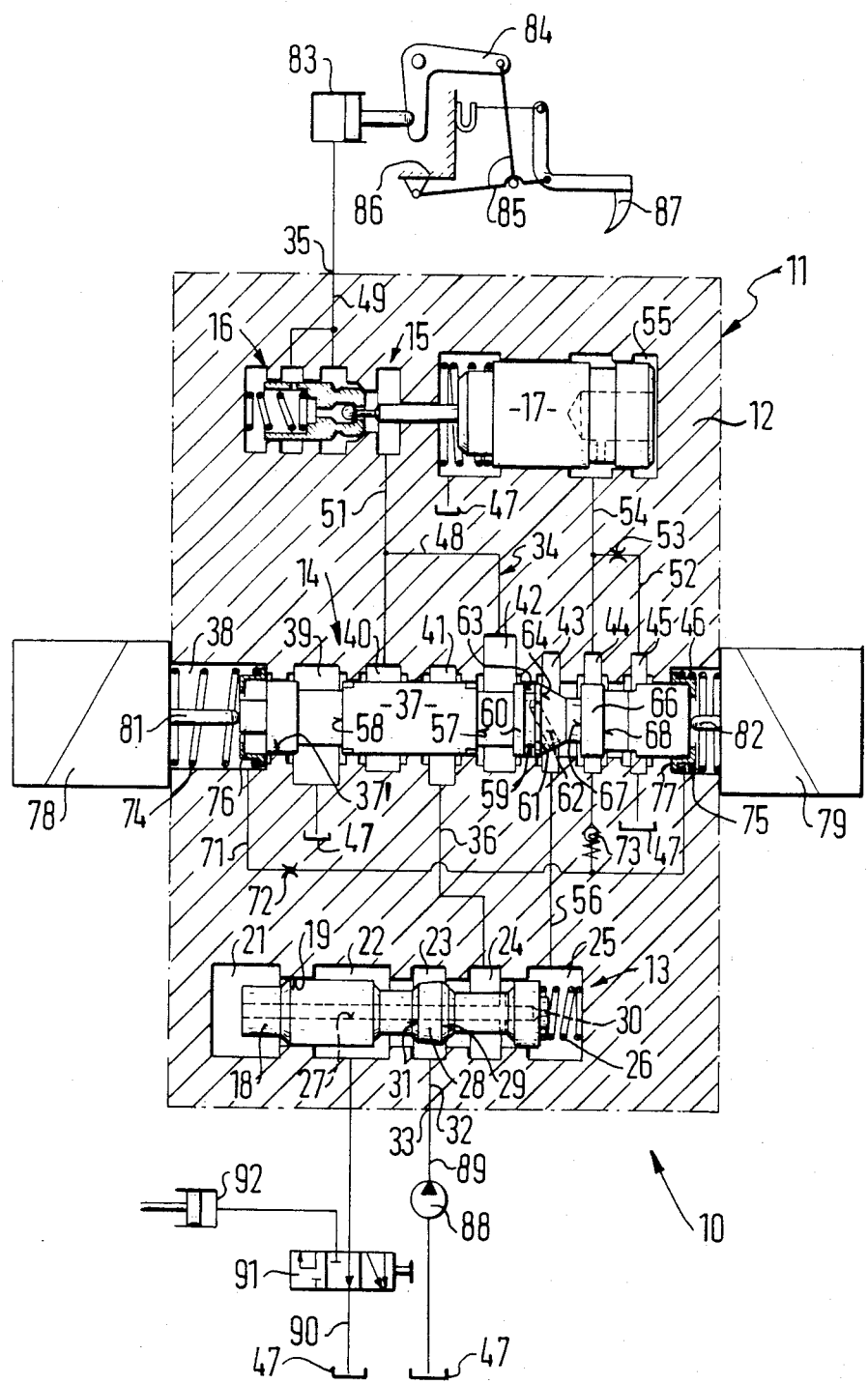

HYDRAULIC CONTROL ARRANGEMENT

BACKGROUND OF THE INVENTION

The present invention relates to a hydraulic control arrangement. More particularly, it relates to a hydraulic control arrangement for a working device provided on an agricultural vehicle and driven by a hydromotor.

Arrangements of the above-mentioned general type are known in the art. One such arrangement is disclosed in the German Patent Application No. P 3,345,192.3. This arrangement has a control slider for controlling a single-acting power lift, and a throttle valve arranged prior to the control slider and operating as a pressure compensating valve and as a pressure reducer. For preventing a return flow of the pressure medium into the spring chamber of the throttle valve, in the position of lifting of the control slider, an additional check valve is arranged in the working conduit. Therefore for opening of the check valve in the position of lifting of the control slider, an additional pressure is needed to reduce the pressure operating during lifting of the power lift. As a result of this, the control arrangement has an expensive construction and operates with relatively high pressure losses.

SUMMARY OF THE INVENTION

Accordingly, it is an object of the present invention to provide a control arrangement of the above-mentioned type, which avoids the disadvantages of the prior art.

More particularly, it is an object of the present invention to provide a control arrangement of the abovementioned type, in which no additional structural elements are needed.

In keeping with these objects and with others which will become apparent hereinafter, one feature of the present invention resides, briefly stated, in a hydraulic control arrangement of the above-mentioned type in which a third control edge separates the spring chamber from the working conduit in the neutral and lifting position of the control slider, and a a fourth control edge connects the spring chamber with the working conduit via a throttle point in the lifting position.

In this construction the communication to the spring chamber of the throttle valve is blocked by means of the control slider in the neutral and lowering position. Therefore, the regulating valve is a simple and compact construction. With the aid of the throttle point in the control slider, an additional pressure lifting in the spring chamber of the throttle valve is possible in the lifting position. The pressure level of the pressure medium in the lifting position is independent of the neutral circulating pressure, so that it can be retained relatively low. The spring of the throttle valve must be just somewhat pretensioned.

In accordance with another advantageous feature of the present invention, the control slider can be provided with a piston portion with negative switching overlap between the working chamber, a second control chamber, and a return chamber.

A control conduit can extend from the second control chamber and has a pressure for controlling a blocking unit arranged in the working conduit between the control sliders and the hydromotor.

A throttle point can be provided in the control conduit. Also, a pressure maintaining valve can be provided in the control conduit.

While with the use of the additional check valve it must be pretensioned to the control pressure of the blocking valve, in this construction the through-flow resistance of the pressure medium in the lowering position is low. Thereby the energy losses in the lowering position are low, and the pressure of the pressure medium flowing to the power lift can be used in an optimal manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view schematically showing a hydraulic control arrangement in accordance with the present invention in a neutral position.

DESCRIPTION OF THE PREFERRED EMBODIMENTS

The control arrangement in accordance with the present invention is identified as a whole with reference numeral 10. It has a regulating valve 11 which is used for regulation of a lifting mechanism of an agricultural vehicle, particularly a tractor with an articulatedly connected plow.

The regulating valve 11 has a housing. A throttling valve 13, a control valve 14, and a blocking unit 15 composed of a blocking valve 16 and an associated pushing piston 17, are arranged in the housing 12 along three parallel axes.

The throttle valve 13 has a throttle slider 18 which slides in a slider opening 19 provided in the housing 12. Several chambers are formed in the slider opening 19 as ringshaped increased portions of the opening and are arranged near one another. These chambers include, as considered from the left to the right, a pressure chamber 21, a running chamber 22, a feed chamber 23, a discharge chamber 24, and a spring chamber 25. The throttle slider 18 is acted upon by a spring 26 which is arranged in the spring chamber 25 and by a pressure in the spring chamber 25 and in the pressure chamber 21. For this purpose, the pressure chamber 21 is in communication with the discharge chamber 24 via a control passage 27 formed in the throttle slider 18. The spring 26 loads the throttle slider 18 to the left in direction of a not shown starting position in which it blocks with its central piston portion 28 the communication from the feed chamber 23 to the running chamber 22.

A servo throttle 30 is further arranged in the throttle slider 18 and located between the control passage 27 and the spring chamber 25, so that its pressure drop can load the throttle slider 18 against the spring 26. A control edge or chamfer 29 is formed on the piston portion 28 and more particularly at its side facing toward the discharge chamber 24. In the starting position of the throttle slider 18, the control edge 29 completely controls the communication from the feed chamber 23 to the discharge chamber 24. Moreover, a second control edge 31 is formed on the piston portion 28 and particularly at its other end side. The second control edge 31 controls the communication from the feed chamber 23 to the running chamber 22. The feed chamber 23 is connected with an inlet 33 of the regulating valve 11 via a first conduit portion 32. A working conduit 34 leads from it to an outlet 35. The throttle valve 13, the control valve 14, and the blocking valve 16 are connected in the working conduit 31 one after the other. A conduit portion 36 which leads from the discharge chamber 24 to the control valve 14 is a part of the working conduit 34.

The control valve 14 has a control slider 37 which is tightly and slidingly guided in a slider opening 37'. A plurality of chambers are formed in the slider opening 37' and arranged one after the other. These chambers include, as considered from the left to the right, a first damping chamber 38, a first return chamber 39, an outlet chamber 40, a first working chamber 41, a first control chamber 42, a second working chamber 43, a second control chamber 44, a second return chamber 45 and a second damping chamber 46. Both return chambers 39 and 45 are unloaded to a tank 47. The second conduit portion 36 of the working conduit 34 opens into the first working chamber 41. A third conduit portion 48 which is a part of the working conduit 34 leads from the second working chamber 42 to the blocking valve 16. A fourth conduit portion 49 leads from it to the outlet 35. A return conduit 51 leads from the outlet 35 via the blocking valve 16 to the outlet chamber 40 and further via the first return chamber 39 to the tank 47. The working conduit 34 and a return conduit 51 are partially identical, namely in the region of the blocking valve 16. A first control conduit 52 leads from the second control chamber 44 via a throttling point 53 to the second return chamber 45 and thereby further to the tank 47. A conduit 54 branches from the control conduit 52 before the throttle point 53 to a pressure chamber 55 which is associated with the pushing piston 17. Further, a second control conduit 56 connects the second working camber 43 in the control valve 14 with the spring chamber 25 in the throttle valve 13.

A first control edge 57 is formed on the control slider 37 and controls the pressure medium stream which flows via the working conduit 34, proportionally to the displacement of the control slider 37. While in a lifting position of the control slider 37 this first control edge 57 controls the communication between the first working chamber 41 and the first control chamber 42, it interrupts this communication in a lowering position and in a shown neutral position. Furthermore, the control slider 37 has a second control edge 58 for controlling in a respective manner the pressure medium stream flowing out via the return conduit 51 to the tank 47. While in the lifting position, and in the neutral position this second control edge 58 interrupts the communication from the outlet chamber 40 to the first return chamber 39, it controls this communication in the lowering position proportionally to the displacement of the slider.

Two small piston portions 60 and 61 are provided on the control slider 37 and separated by an annular groove 59. The piston portion 61 which faces toward the second working chamber 43 has an opening which extends somewhat transversely and serves as a throttle point 62. A third control edge 63 of the piston portion 60 blocks in the position of lowering of the control slider 37 and in the shown neutral position, the communication from the first control chamber 42 to the second working chamber 43. In the position of lifting the control edge 63 opens its communication, however, the piston portion 61 blocks with fourth control edge 64 the communication from the second working chamber 43 to the first control chamber 42, so that the pressure medium flow is possible only through the throttling point 62. Furthermore, a third piston portion 66 is formed on the control slider 37 and has a control edge 67 which controls the communication between the second working chamber 43 and the second control chamber 44 and therefore influences the communication via the control conduit 52 to the tank 47. A control edge 68 formed on the piston portion 66 controls the communication from the second control chamber 44 to the second return chamber 45. The piston portion 66 is only so wide that in the shown neutral position of the control slider 37 it has a negative switching overlap, or in other words, it does not block either the communication from the second working chamber 43 to the second control chamber 44, or the communication from it to the second return chamber 45. In the position of lifting the control edge 67 blocks the communication from the second working chamber 43 to the second control chamber 44. In the position of lowering the other control edge 68 blocks the communication from the second control chamber 44 to the second return chamber 45.

Both damping chambers 38 and 46 are connected with one another via a compensating passage 71. A throttle 72 is arranged in the compensating passage 71. The compensating passage 71 is connected via a spring-loaded check valve 73 with the control chamber 74 so that the check valve 73 opens toward the compensating passage 71. A return spring 74 or 75 as well as a spring plate 76 and 77 is arranged in each damping chamber 38 and 46, respectively. In the not actuated drive of the control slider 37 they are centered in the shown and neutral position. Both damping chambers 38 and 46 are closed outwardly by electromagnets 78 and 79. The movable armatures of the magnets 78 and 79 are in operative communication via actuating plungers 81 and 82 with the control slider 37.

A single-acting hydromotor connected with the outlet 35 of the regulating valve 11 actuates a plow 87 pivotably connected with a tractor frame 86, via a lifting arm 84 and a conventional three-point linkage 85. The inlet 33 of the regulating valve 11 is supplied with a pressure medium by a pump 88 via a supply conduit 89.

An outlet conduit 90 leads from the running chamber 22 in the throttle valve 13 to the tank 47. A multi-way valve 91 is arranged in the outlet conduit 90 and can control a second hydromotor 92. The control arrangement 10 is therefore formed for an open circulation.

With the not energized electromagnets 78 and 79 the control slider 37 is centered by its return springs 74 and 75 in its neutral position shown in the drawing. Then the control edges 57, 58, 63 are closed. The piston portion 66 blocks the communication from the second working chamber 43 to the second control chamber 44 and also from this to the second return chamber 45. In other words, it operates in the neutral position with negative switching overlap. A small control oil stream branches from the pressure medium stream which is supplied from the pump 88 via the supply conduit 89 into the feed chamber 23 of the throttle valve 13. This small control oil stream flows through the throttling first control edge 29 in the discharge chamber 24, via the control passage 27 and the servo valve 30 in the spring chamber 25, and via the second control conduit 56 in the second working chamber 43. From there it flows via the second control chamber 44 in the second return chamber 45 and in the tank 47. The communication from the second working chamber 43 to the first control chamber 42 is blocked by the piston portion 60 and its control edge 63. This control oil stream causes at the servo throttle 30 a pressure drop which displaces the control slider 18 against the force of a spring 26 to the right. Since the spring 26 has a small tension, the throttle slider 18 is somewhat displaced to the right. Thereby a low neutral circulation pressure is possible. The throttle slider 18 operates as a flow regulating slider which maintains the control oil stream flowing to the tank 47 constant and at a level which is as small as possible. If the second hydromotor is not actuated, the pressure medium stream supplied by the pump 88 can discharge also from the feed chamber 23 via the running chamber 22 in the discharge conduit 90 and further to the tank 47.

When for lifting of the plow 87 a pressure medium stream must flow via the working conduit 34 of the regulating valve 11 to the power lift 83, the electromagnet 79 is energized and the control slider 37 displaces to the left. In the region of the lifting positon of the control slider 37 the control edges 57, 63 and 68 are more or less further controlled, whereas the control edges 58 and 67 block their associated communications. A pressure medium stream flows from the pump 88 via the working conduit 34 with the throttle valve 13, the control valve 14, and the open control valve 16 to the power lift 83. Since the control edge 67 of the control slider 37 is open, the pressure medium flows in the control valve 14 from the first working chamber 41 to the second control chamber 42. Simultaneously the pressure medium also flows in the second control conduit 56 between the spring chamber 25 of the throttle valve 13 and the second working chamber 43 of the control valve 14. Since in the lifting position of the control slider 37 the control edge 63 is open, and the piston portion 60 opens the communication from the first control chamber 42 to the second working chamber 43, the pressure medium which flows via the control conduit 56 from the spring chamber 25 in the second working chamber 43 can flow via the throttle 62 and the annular groove 59 into the first control chamber 42. The control edge 67 of the piston portion 66 blocks the communication from the second working chamber 43 to the second control chamber 44, so that the total pressure medium quantity flowing into the second working chamber 43 flows further via the throttle 62. The pressure which drops at the throttle point 62 acts via the control conduit 66 in the spring chamber 25 of the throttle valve 13. The second control edge 31 on the throttle slider 18 of the throttle valve 13 throttles during the lifting step of the power lift 83 the communication from the feed chamber 23 to the running chamber 22. Because of the pressure difference before and after the control edge 57 of the control slider 37, the throttle slider 18 operates as a pressure balance for the control edge 57 which serves as a control throttle point. Thereby a load-compensated proportional lifting control of the power lift 83 is possible. Simultaneously, the pressure which drops at the throttle point 62 lifts the pressure level in the spring chamber 25 relative to the pressure in the neutral position. Thereby a low neutral circulating pressure in the pressure chamber 25 and a high pressure drop in the position of lifting is possible. In the lifting position a higher regulating pressure is possible than in the neutral position, whereby the pressure medium flow to the power lift 83 can be increased.

The throttle point 62 can be formed as a longitudinal groove extending peripherally of the piston portion 61 or as a throughgoing opening extending through the piston portion.

Since the control edge 57 of the piston portion 66 of the control slider 37 blocks the communication from the second working chamber 43 to the second control chamber 44, no pressure can form in the latter. The pressure chamber 55 of the pushing piston 17 is unloaded via the conduit 54, the control conduit 52, and the second return chamber 55 to the tank 57. Therefore no pressure can form in the pressure chamber 55 in the lifting position of the control slider 37.

When for lifting the plow 87 the pressure medium must be discharged from the power lift 83, the other electromagnet 78 is energized and thereby control slider 37 is moved from the shown neutral position to the right in its lowering position. The control edge 58 of the control slider 37 unloads the return conduit 51 from the outlet chamber 40 to the first return chamber 39 and further to the tank 47. The control edges 57, 63 and 68 block their associated communications. Simultaneously, the control edge 67 opens the communication from the second working chamber 43 to the second control chamber 44, so that the control oil stream can discharge from the spring chamber 25 of the throttle valve 13 via the conduit 56 and via the control conduit 52 with the throttle point 53, to the second return chamber 45 and to the tank 47. The pressure adjusted at the throttle point 53 acts via the conduit 54 in the pressure chamber 55 and upon the pushing piston 17 which opens the servo controlled control valve 16. The pressure medium can now flow from the power lift 83 via the control valve 16 and return conduit 51 to the tank 47, while the control edge 58 determines the magnitude of this stream. Since the control edge 63 blocks the communication from the first control chamber 42 to the second working chamber 43 no discharging pressure medium can arrive from the return conduit 51 via the third conduit portion 48 of the working conduit 34 to the second working chamber 43. If the multi-way valve 91 connected after it is not actuated, the second control edge 31 of the throttle slider 18 throttles the communication from the feed chamber 23 to the running chamber 22 only so long that a pressure is formed in the discharge chamber 24 which maintains the weight equilibrium with the weak pre-tensioned spring 26. The control oil stream which flows via the control edge 67 into the second control chamber 44 has therefore a constant pressure level whose magnitude is determined by the spring 26 in the throttle valve 13. This pressure level is lifted at the pressure point 53 to the pressure level required for controlling the pushing piston 17.

The pressure which acts in the second control chamber 44 acts via the check valve 73 in the compensating channel 71 which connects both damping chambers 38 and 46 with one another. When for some reasons air inclusions are available in the damping chambers 38 and 46, this air is pre-tensioned by the pressure acting in the second control chamber 44. This pre-tensioned air disturbs the operation of the control valve 14 considerably less than in the case without pre-tensioning.

It will be understood that each of the elements described above, or two or more together, may also find a useful application in other types of constructions differing from the types described above.

While the invention has been illustrated and described as embodied in a hydraulic control arrangement it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hydraulic control arrangement for a working device which is driven by a single acting hydromotor and arranged particularly on an agricultural vehicle, the control arrangement comprising a pressure medium source; a throttle valve, a control valve and a blocking unit located in three planes, said control valve having a control slider having a first control edge which controls a pressure medium stream flowing to the hydromotor during lifting, and a second edge which controls the pressure medium stream flowing from the hydromotor during lowering; a working conduit extending from said pressure medium source via said first control edge of said control slider to the hydromotor; a spring-loaded throttle slider arranged before said control slider in said working conduit and providing a load-sensing control; a spring chamber associated with said throttle slider; a third control edge which in the positions of neutral and of lowering of said control slider separates said spring chamber from said working conduit; a fourth control edge which in the position of lifting communicates said spring chamber with said working conduit via a throttle point; a plurality of chambers associated with said control slider and including first and second control chambers, first and second working chambers, said control slider having a first piston portion provided with in annular groove, said third and fourth control edges being formed on said first piston portion and separated by said annular groove, said piston portion controlling a communication from said second working chamber, said blocking unit having a blocking valve; and a first control conduit, said working conduit extending from said first control chamber to said blocking valve, said second working chamber being connected via said first control conduit with said spring chamber of said throttle slider.

2. A control arrangement as defined in claim 1; and further comprising first and second return chambers associated with said control slider, said control slider having a second piston portion with a negative switching overlap between said second working chamber, said second control chamber and said second return chamber.

3. A control arrangement as defined in claim 2, wherein said second control chamber in the position of lifting of said control slider is separated from said second working chamber by said second piston portion with negative switching overlap.

4. A control arrangement as defined in claim 2, wherein said second control chamber in the position of lowering of said control slider is blocked from said second return chamber by said second piston portion with negative switching overlap.

5. A control arrangement as defined in claim 1, wherein said blocking unit is arranged in said working conduit between said control slider and the hydromotor; and further comprising a second control conduit extending from said second control chamber and having a pressure controlling said blocking unit.

6. A control arrangement as defined in claim 5, wherein said second control conduit is provided with a throttle point.

7. A control arrangement as defined in claim 5, wherein said second control conduit is provided with a pressure maintaining valve.

8. A control arrangement as defined in claim 1, wherein said throttle valve is a three-way throttle valve, said throttle slider being a part of said three-way throttle valve and having two further control edges.

9. A hydraulic control arrangement for a working device which is driven by a single-acting hydromotor and arranged particularly on an agricultural vehicle, the control arrangement comprising a pressure medium source; a control slider having a first control edge which controls a pressure medium stream flowing to the hydromotor during lifting, and a second control edge which controls the pressure medium stream flowing from the hydromotor during lowering; a working conduit extending from said pressure medium source via said first control edge of said control slider to the hydromotor; a spring-loaded throttle slider arranged before said control slider in said working conduit and providing a loadsensing control; a third control edge which in the positions of neutral and of lowering of said control slider separates said spring chamber from said working conduit; and a fourth control edge which in the position of lifting communicates said spring chamber with said working conduit via a throttle point; a compensating passage with a further throttle point therein; a check valve which opens in said compensating passage; a plurality of chambers associated with said control slider and including first and second control chambers and damping chambers, said damping chambers being connected with one another by said compensating passage with said further throttle point, said second control chamber being connected with said compensating passage by said check valve.

* * * * *